United States Patent [19]
Degady et al.

[11] Patent Number: 5,472,733
[45] Date of Patent: Dec. 5, 1995

[54] DRY EXTRUSION COOKING OF SUGAR OR SUGARLESS PRODUCTS

[75] Inventors: Marc Degady, Morris Plains; Joseph D. Posta, Stanhope, both of N.J.

[73] Assignee: Warner-Lambert Company, Morris Plains, N.J.

[21] Appl. No.: 339,437

[22] Filed: Nov. 14, 1994

[51] Int. Cl.[6] .................................. A23G 3/00; A23P 1/00
[52] U.S. Cl. ........................ 426/660; 426/448; 426/516
[58] Field of Search .................................... 426/660, 658, 426/448, 516, 519

[56] References Cited

U.S. PATENT DOCUMENTS

| | | | |
|---|---|---|---|
| 4,076,846 | 2/1978 | Nakatsuka et al. | 426/516 |
| 4,136,209 | 1/1979 | Fox | 426/658 |
| 4,713,256 | 12/1987 | Chaveron et al. | 426/660 |
| 4,839,193 | 6/1989 | Mange et al. | 426/448 |
| 5,013,575 | 5/1991 | Stadler et al. | 426/660 |
| 5,051,500 | 9/1991 | Elmore | 536/50 |
| 5,135,760 | 8/1992 | Degady et al. | 426/516 |

OTHER PUBLICATIONS

A. G. Dodson, B.Sc. Ph.D. and S. J. C. Wright, Research Reports No. 496, "Novel Methods for the Manufacture of Confectionery Products. Part IV. Further Extrusion Cooking of Sugar Confectionery" Dec. 1984.

*Primary Examiner*—George Yeung
*Attorney, Agent, or Firm*—Linda A. Vag

[57] ABSTRACT

The present invention pertains to a method for preparing a confection from a sugar or sugarless bulking agent which comprises, in the downstream direction of conveyance, the continuous sequence of steps of:

a) introducing the bulking agent into the barrel of a twin screw extruder equipped with multiple heating zones;

b) extrusion mixing the bulking agent in a first series of heating zones to melt the bulking agent, wherein the first series of heating zones is configured to include a minimum time for melting the bulking agent;

c) extrusion mixing the melted bulking agent from the first series of heating zones to an orifice plug, wherein the orifice plug is configured to include a minimum time for melting the bulking agent;

d) extrusion mixing the melted bulking agent from the orifice plug to a heating zone having a pressure control valve, wherein the pressure control valve is configured to include a minimum time for melting the bulking agent;

e) extrusion mixing the melted bulking agent from the heating zone having the pressure control valve to a heating zone having a vent port, wherein the vent port is configured to include a minimum evaporation time to reduce the moisture content of the confection to less than about 2%; and f) extrusion mixing the melted bulking agent from the heating zone having the vent port to the exit of the extruder to form a glassy confection.

This invention also pertains to confections prepared by the inventive method.

22 Claims, 1 Drawing Sheet

DRY EXTRUSION COOKING OF SUGAR OR SUGARLESS PRODUCTS

BACKGROUND OF THE INVENTION

1. Field of the Invention

The present invention pertains to a method for the continuous preparation of a sugar or sugarless confection from a sugar or sugarless bulking agent. More specifically, the present method comprises extrusion mixing a bulking agent in a twin screw extruder, configured to include a minimum time for melting the bulking agent. The twin screw extruder is equipped with multiple heating zones, forward feed screws, forward compression screws, reverse flight screws, forward mixing paddles, an orifice plug, and a pressure control valve. The twin screw extruder is also equipped with a vent port configured to include a minimum evaporation time to reduce the moisture content of the confection to less than about 2%.

2. Description of the Background

The preparation of confectionery formulations is historically well known and has changed little through the years. Confectionery items have been classified as either "hard" confectionery or "soft" confectionery. In general, a hard confectionery has a candy base composed of a mixture of sugar and other carbohydrate bulking agents kept in an amorphous or glassy condition. This candy base is considered a solid syrup of sugars generally containing up to about 92% sugar, up to about 55% corn syrup, and from about 0.1% to about 5% water, by weight. The syrup component is generally prepared from sucrose and corn syrup but may include other materials. Further ingredients such as flavoring agents, sweetening agents, acidifying agents and coloring agents may also be added. Confectionery formulations are routinely prepared by conventional methods such as those involving fire coolers, vacuum cookers, and scraped-surface cookers, also referred to as high speed atmospheric cookers.

The use of PALATINIT® (isomalt, Suddeutsche Zucker) based high-boiled sugarless product formulations has generated interest in both international and domestic markets. A problem with the preparation of such confections is that current prototype formulations require the need for higher than normal cooking temperatures (290° F.–330° F.) to achieve an acceptable final product moisture. These high temperature ranges push current cooking systems to their upper limits of operation (120 psi at 340° F.). At this high cooking temperature, the discharge viscosity of the isomalt candy base is very low compared with conventional production formulations. This low viscosity isomalt candy base has poor water vapor removal properties during vacuum discharge and handing difficulties during the remaining stages of production. Because isomalt has a relatively low water solubility, additional water and higher temperatures are required to process the bulking agent. An extended period of mixing in the predissolver stage of the cooker operation also helps maintain isomalt in solution.

Methods for extrusion cooking of sugar confectionery are known, as in the British Food Manufacturing Industries Research Association, Research Reports No. 496, Dec., 1984. A method for continuously preparing a chewing gum in a co-rotating twin screw extruder and reducing agglomerations by employing dual gum base injection is disclosed in U.S. Pat. No. 5,135,760. A method for preparing polydextrose from a reducing polysaccharide and a polyol in a co-rotating twin screw extruder is disclosed in U.S. Pat. No. 5,051,500.

SUMMARY OF THE INVENTION

The present invention pertains to a method for preparing a confection from a sugar or sugarless bulking agent which comprises, in the downstream direction of conveyance, the continuous sequence of steps of:

a) introducing the bulking agent into the barrel of a twin screw extruder equipped with multiple heating zones;

b) extrusion mixing the bulking agent in a first series of heating zones to melt the bulking agent, wherein the first series of heating zones is configured to include a minimum time for melting the bulking agent;

c) extrusion mixing the melted bulking agent from the first series of heating zones to an orifice plug, wherein the orifice plug is configured to include a minimum time for melting the bulking agent;

d) extrusion mixing the melted bulking agent from the orifice plug to a heating zone having a pressure control valve, wherein the pressure control valve is configured to include a minimum time for melting the bulking agent;

e) extrusion mixing the melted bulking agent from the heating zone having the pressure control valve to a heating zone having a vent port, wherein the vent port is configured to include a minimum evaporation time to reduce the moisture content of the confection to less than about 2%; and f) extrusion mixing the melted bulking agent from the heating zone having the vent port to the exit of the extruder to form a glassy confection.

The invention also pertains to confections prepared by the inventive method.

DETAILED DESCRIPTION OF THE INVENTION

Figure 1:
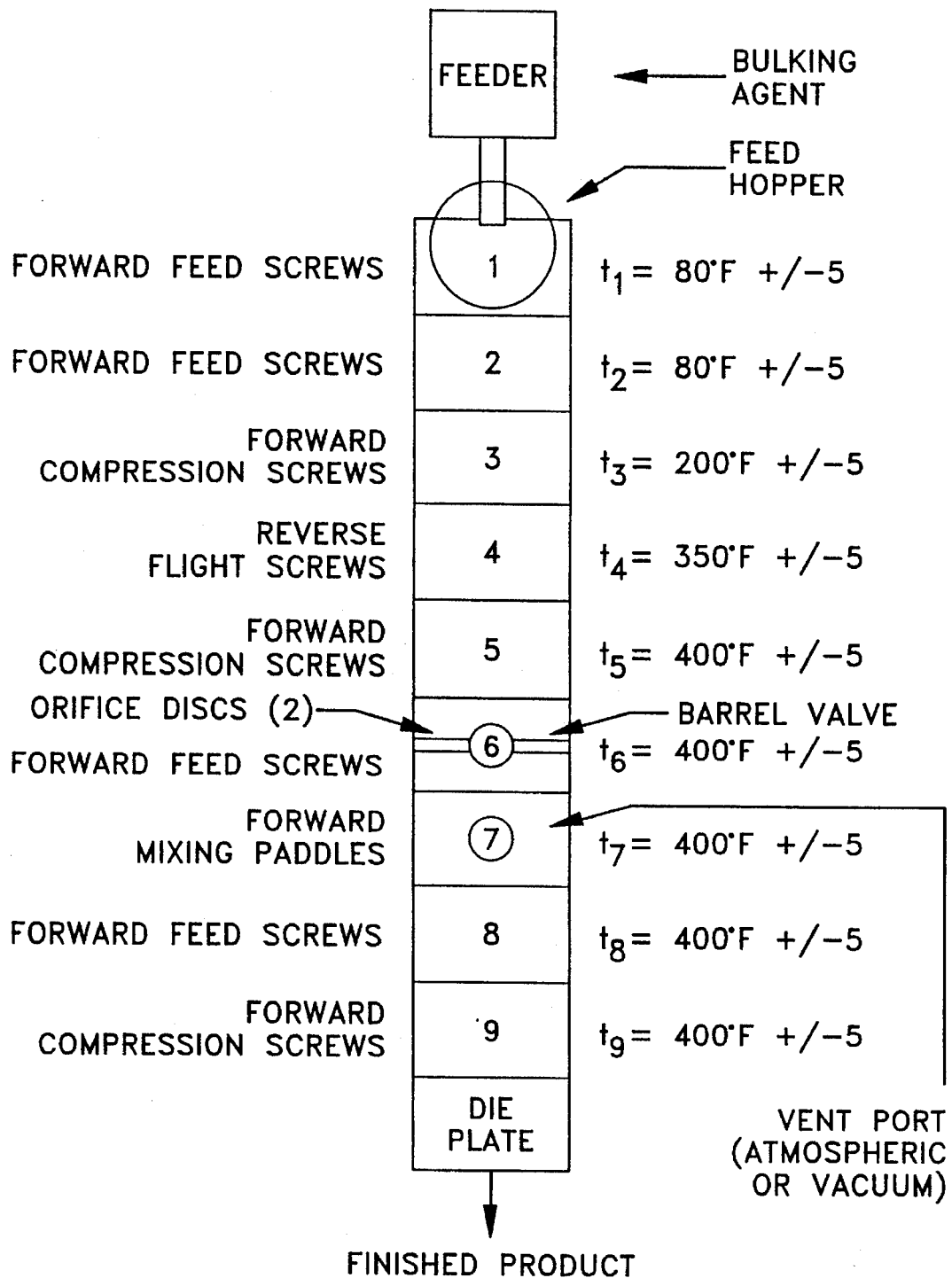
FIG. 1 is an illustration of a twin screw extruder configured to continuously prepare a confection from a sugar or sugarless bulking agent according to the method of the present invention.

The present invention pertains to a method for continuously preparing a confection from a sugar or sugarless bulking agent. More specifically, the present method comprises extrusion mixing a bulking agent in a twin screw extruder configured to include a minimum time for melting the bulking agent. The twin screw extruder is equipped with multiple heating zones, forward feed screws, forward compression screws, reverse flight screws, forward mixing paddles, an orifice plug, and a pressure control valve. The twin screw extruder is also equipped with a vent port configured to include a minimum evaporation time to reduce the moisture content of the confection to less than about 2%. The bulking agent is introduced into the extruder and mixed intimately on a macro and micro molecular level under mild pressure and temperature operating conditions to form a homogeneous cooked confectionery product. Because of the low residence time of the bulking agent in the extruder, the method of the present invention minimizes product degradation and significantly reduces energy costs over conventional candy cooking methods. The present method is a simple, one-step, rapid, versatile, relatively inexpensive, and efficient process for producing low-volatile cooked confectionery products without employing a solvent. The product can be quenched internally or externally to the extruder for use in subsequent operations. This invention also pertains to confections prepared by the inventive method.

The term "glassy confection", as used herein, means a hard, sugar or sugarless glass, amorphous, candy product. The candy base may be a solid syrup of sugars normally containing up to about 92% sugar and up to about 55% corn syrup, and from about 0.1% to about 5% water, preferably from about 0.1% to about 4% water, and more preferably from about 0.5% to about 2% water by weight of the final composition.

The sugar or sugarless component of the candy base may be any bulking agent material normally used in the manufacture of confectionery products such as those selected from the group consisting of, but not limited to, monosaccharides, disaccharides, polysaccharides, sugar alcohols; polydextrose, a randomly bonded glucose polymers such as those polymers distributed by Pfizer, Inc., Groton, Connecticut; isomalt (a racemic mixture of alpha-D-glucopyranosyl-1,6-mannitol and alpha-D-glucopyranosyl-1,6-sorbitol manufactured under the tradename PALATINIT® by Suddeutsche Zucker), maltodextrins; hydrogenated starch hydrolysates such as LYCASIN® (Roquette Corporation) and HYSTAR® (Lonza, Inc.); hydrogenated hexoses; hydrogenated disaccharides; and mixtures thereof.

Suitable sugar bulking agents include monosaccharides, disaccharides and polysaccharides such as xylose, ribulose, glucose (dextrose), mannose, galactose, fructose (levulose), sucrose, maltose, invert sugar, partially hydrolyzed starch and corn syrup solids, and mixtures thereof. Mixtures of sucrose and corn syrup solids are the preferred sugar bulking agents.

Suitable sugar alcohol bulking agents include sorbitol, xylitol, mannitol, galactitol, maltitol, isomalt, hydrogenated starch hydrolysates and mixtures thereof.

In a preferred embodiment, the bulking agent is isomalt. For economical reasons it is also preferred to use a mixture of isomalt and a hydrogenated starch hydrolysate wherein the isomalt is present at 10%–50% by weight of the mixture.

While in the practice of the present invention the bulking agent is generally used in the powdered or granular form, extrusion cooking is also applicable to high water (30%–40%) content bulking agents In this case, the water is pre-flashed in a flash drum prior to the introduction of the bulking agent to the extruder.

A preferred multiple-zoned extruder useful in carrying out the method of the present invention is a twin screw extruder which has two intermeshing screw shafts composed of individual conveying and kneading elements of different pitches and lengths. While either a co-rotating or counter-rotating twin screw extruder may be used in the practice of the present invention, the preferred embodiment uses a co-rotating twin screw extruder such as the APV Baker Model No. MPF-80-D or equivalent. Each intermeshing screw rotates in the same direction in the barrel in a bore having a figure eight cross section. Preferably, the twin screw extruder contains forward feed screws, forward compression screws, reverse flight screws, forward mixing paddles, an orifice plug, a pressure control valve, e.g., barrel valve, and a vent port. The forward feed screws move product forward with least resistance. The forward compression screws raise the product pressure. The reverse flight screws increase the residence time of the product in the screws for faster melting. The forward mixing paddles insure product homogeneity. The paddle elements of the extrusion apparatus can be set at various angles to provide mixing of the various ingredients in a unidirectional flow without generating high temperatures and pressures which can damage the ingredients. The orifice plug and the pressure control valve control the overall residence time of the product in the screws and introduces the product into the atmospheric section under pressure to facilitate water stripping. The orifice plug may be configured to include two orifice discs to control the flow of material. The pressure control valve may be configured to include a controlling device to remove water vapor away from the extruder. The vent port allows water vapor to leave the extruder. The vent port may be configured to include a vacuum device to remove water vapor away from the extruder. Thermocouples may also be optionally included in the extruder for monitoring internal temperatures.

The top of the extruder barrel useful in carrying out the method of the present invention may also contain numerous entry ports for introducing various optional ingredients described further below. Those ports not being used for introducing the ingredients are sealed to provide a closed system. The order of introduction of any optional ingredients is a matter of choice for the artisan. The final candy product can be custom tailored by selecting different entry ports for the various ingredients.

The resultant candy is obtained as a glassy mass which may be formed into desired shapes by direct deposit into molds or, once the candy mass has been properly tempered, by cutting into workable portions or by using other conventional methods. A variety of forming techniques may be utilized depending upon the shape and size of the final product desired. A general discussion of the composition and preparation of hard confections may be found in H. A. Lieberman, Pharmaceutical Dosage Forms: Tablets, Volume 1 (1980), Marcel Dekker, Inc., New York, N.Y. at pages 339 to 469, which disclosure is incorporated herein by reference.

The method of the present invention for continuously preparing a confection from a sugar or sugarless bulking agent can best be understood by reference to FIG. 1. FIG. 1 illustrates a twin screw extruder, such as the APV Baker Model No. MPV-80D, configured in a preferred embodiment for the practice of the present invention. Although the present invention is described and illustrated in connection with the preferred embodiments, applicants intend that modifications and variations may be used without departing from the spirit of the invention.

As set out in FIG. 1, the bulking agent is fed from a feed hopper into Zone 1 of the twin screw extruder via a loss-in-weight screw feeder to insure feed rate accuracy. Zones 1 and 2 are configured with forward feed screws to move the bulking agent consistently downstream and prevent backup of the bulking agent at the inlet feeding port. Zone 3 is configured with forward compression screws to raise the temperature and pressure of the bulking agent to premelt the bulking agent. Zone 4 is configured with reverse flight screws to hold the bulking agent temporarily in place under high shear to complete the melting of the bulking agent. Zone 5 is configured with forward compression screws to raise the pressure of the melted bulking agent to enable it to overcome the resistance of the orifice disc plugs between Zone 5 and Zone 6. The resistance of the orifice disc plugs is a function of the surface area of the orifice which may be controlled by opening or closing the pressure control valve, e.g. barrel valve, in Zone 6. The smaller the size of the orifice, the higher the resistance the orifice offers, and the longer the bulking agent is held upstream of the orifice. The amount of cooking depends on the holding time of the bulking agent upstream of the orifice. Zone 6 is configured with forward feed screws to move the bulking agent downstream and away from the orifice plug. Zone 7 is configured with forward mixing paddles to provide mixing and insure bulking agent homogeneity in case some particles escaped through the screw configuration without melting. Zone 7 is also configured with a vent port to remove water from the bulking agent melt at low temperature. Zone 8 is configured with forward feed screws to pull the bulking agent away from the stagnant mixing paddles in Zone 7. Zone 9 is configured with forward compression screws to raise the pressure of the bulking agent melt and force the melt through the die plate at the end of the twin screw extruder.

Each Zone of the extruder has a suitable, predetermined, temperature set point. Zones 1 and 2 are set equal to 80°±5° F.; Zone 3 is set equal to 200°±5° F.; Zone is set equal to 350°±5° F.; Zones 5, 6, 7, 8, and 9 are set equal to 400°±5° F. The actual temperature in each Zone may vary from the set point since the actual temperature will of course be dependent on the heat capacity of the bulking agent used.

The bulking agent is fed into Zone 1 at a feed rate from about 50 lbs/hr to about 400 lbs/hr, preferably from about 100 lbs/hr to about 200 lbs/hr. A mixing speed of from about 80 rpm to about 200 rpm, preferably from about 80 rpm to about 120 rpm, is used to convey the bulking agent in the downward direction of conveyance through the extrusion Zones.

For extrusion processes in which a high water (30%–40%) content sugar alcohol or other bulking agent is used in place of a powdered or granular form of bulking agent, the water is pre-flashed in a flash drum prior to the introduction of the bulking agent into the extruder. The flash drum operating temperature is from 200° F. to 400° F., preferably 230° F. to 260° F. and the vacuum pressure is from 15" to 25" of mercury, preferably 18" to 21" of mercury. The flash drum will reduce the water content of the bulking agent to 6–10%. The bulking agent can then be fed into Zone 1 of the extruder as set out above.

For illustration of the preferred embodiments, isomalt was used as a representative bulking agent in the twin screw extruder configured as above. Isomalt was fed into Zone 1 from the feed hopper at room temperature and a feed rate of 100–200 lbs./hr. The mixing speed of the extruder was set at 100 rpm and the isomalt was conveyed in the downward direction of the twin screw extruder as set forth above. The actual temperature in each Zone was determined during the mixing process: Zone 1—72° F.; Zone 2—83° F.; Zone 3—190° F.; Zone 4—345° F.; Zone 5—347° F.; Zone 6—358° F.; Zone 7—337° F.; Zone 8—344° F.; Zone 9—355° F. The extruded isomalt candy mass forced through the die plate at the end of the twin screw extruder was deposited into molds and allowed to cool. The moisture content of the candy was subsequently determined by Karl-Fisher moisture analysis. All extruded samples had moisture less than about 2%. Most samples were transparent with no noticeable air bubbles.

Effective amounts of a variety of conventional ingredients may be included in the confection formed in the practice of the present invention. As described previously herein, these ingredients may be added through optional ports on the extruder or may be admixed with the bulking agent. Included in these ingredients are intense sweeteners, coloring agents, flavoring agents, fillers, and the like. The fillers may be mineral such as calcium carbonate, talc, magnesium carbonate, alumina, dicalcium phosphate and the like. Other conventional confectionery additives known to one having ordinary skill in the art, such as preservatives, may also be used in the candy.

An intense sweetener is a sweetening agent which has a sweetness intensity substantially greater than that of sucrose. Suitable high intensity sweetening agents include dihydrochalcones, monellin, Stevia Rebaudiana (steviosides), and glycyrrhizin; Saccharin and its soluble salts; cyclamate and its salts; 3,4-dihydro-6-methyl-1,2,3-oxathiazine-4-one-2,2-dioxide (Acesulfame) and salts thereof; L-aspartic acid derived sweetening agents such as L-aspartyl-L-phenylalanine methyl ester (Aspartame), L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenylglycine, L-aspartyl-2,5-dihydro-L-phenylalanine, and L-aspartyl-L-(1-cyclohexen)alanine; and chlorinated derivatives of sucrose such as chlorodeoxysucrose and chlorodeoxygalactosucrose preferably 4,1',6'-trichloro-4,1'6'-trideoxygalactosucrose, or 4-chloro-4-deoxy-alpha-D-galactopyranosyl-1,6-dichloro-1,6-dideoxy-beta D-fructofuranoside, SUCRALOSE®, (McNeil Specialty Company).

The intense sweetener may be present in a range from 50 ppm to 0.3% by weight of bulking agent. The sweetener may be added separately or optionally in admixture with the bulking agent.

The flavoring agents which may be used include those flavors known to the skilled artisan, such as natural and/or synthetic flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylanisol, acetaldehyde, benzaldehyde, anisic aldehyde, cinnamic aldehyde, citral, i.e., alpha-citral, neral, i.e., beta-citral, decanal, ethyl vanillin, heliotrope, i.e., piperonal, vanillin, alpha-amyl cinnamaldehyde, butyraldehyde, valeraldehyde, citronellal, decanal, aldehyde C-8, aldehyde C-9, aldehyde C-12, 2-ethyl butyraldehyde, hexenal, i.e., trans-2, tolyl aldehyde, veratraldehyde, 2,6-dimethyl-5-heptenal, i.e., melonal, 2,6-dimethyloctanal, and 2-dodecenal.

Generally any flavoring or food additive such as those described in Chemicals Used in Food Processing, publication 1274, pages 63–258, by the National Academy of Sciences, may be used. The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

The amount of flavoring agent employed herein is normally a matter of preference subject to such factors as the type of final candy composition, the individual flavor, the bulking agent employed, and the strength of flavor desired. Thus, the amount of flavoring may be varied in order to obtain the result desired in the final product and such variations are within the capabilities of those skilled in thwart without the need for undue experimentation. In candies, the flavoring agent is generally present in amounts from about 0.02% to about 5%, and preferably from about 0.1% to about 2%, and more preferably, from about 0.8% to about 1.8%, by weight.

The coloring agents useful in the present invention are used in amounts effective to produce the desired color. These coloring agents include pigments which may be incorporated in amounts up to about 6%, by weight. A preferred pigment, titanium dioxide, may be incorporated in amounts up to about 2%, and preferably less than about 1%, by weight. The coloring agents may also include natural food colors and dyes suitable for food, drug and cosmetic applications. These coloring agents are known as F.D.& C. dyes and lakes. The materials acceptable for the foregoing uses are preferably water-soluble. Illustrative nonlimiting examples include the indigoid dye known as F.D.& C. Blue No. 2, which is the disodium salt of 5,5-indigotindisulfonic acid. Similarly, the dye known as F.D.& C. Green No.1 comprises a triphenylmethane dye and is the monosodium salt of 4-[4-(N-ethyl-p-sulfoniumbenzylamino) diphenylmethylene]-[1-(N-ethyl-N-p-sulfoniumbenzyl)-delta- 2,5-cyclohexadienimine]. A full recitation of all F.D.& C. coloring agents and their corresponding chemical structures may be found in the Kirk-Othmer Encyclopedia of Chemical Technology, 3rd Edition, in volume 5 at pages 857–884, which text is incorporated herein by reference.

The present invention is further directed to a confection comprising a sugar or sugarless bulking agent prepared by a method which comprises, in the downstream direction of conveyance, the continuous sequence of steps of:

a) introducing the bulking agent into the barrel of a twin screw extruder equipped with multiple heating zones;

b) extrusion mixing the bulking agent in a first series of heating zones of the extruder to melt the bulking agent, wherein the first series of heating zones is configured to include a minimum time for melting the bulking agent;

c) extrusion mixing and passing the melted bulking agent from the first series of heating zones to an orifice plug, wherein the orifice plug is configured to include a minimum time for melting the bulking agent;

d) extrusion mixing and passing the melted bulking agent from the orifice plug to a heating zone having a pressure control valve, wherein the pressure control valve is configured to include a minimum time for melting the bulking agent;

e) extrusion mixing and passing the melted bulking agent from the heating zone having a pressure control valve to a heating zone having a vent port, wherein the vent port is configured to include a minimum evaporation time to reduce the moisture content of the confection to less than about 2%; and f) extrusion mixing and passing the melted bulking agent from the heating zone having a vent port to the exit of the extruder barrel to form a melted bulking agent in the form of a glassy confection with minimal air bubbles.

The invention being thus described, it will be obvious that the same may be varied in many ways. Such variations are not to be regarded as a departure from the spirit and scope of the invention and all such modifications are intended to be included within the scope of the following claims.

We claim:

1. A method for preparing a confection from a sugar or sugarless bulking agent which comprises, in the downstream direction of conveyance, the continuous sequence of steps of:

a) introducing the bulking agent into the barrel of a twin screw extruder equipped with multiple heating zones;

b) extrusion mixing the bulking agent in a first series of heating zones to melt the bulking agent, wherein the first series of heating zones is configured to include a minimum time for melting the bulking agent;

c) extrusion mixing the melted bulking agent from the first series of heating zones to an orifice plug, wherein the orifice plug is configured to include a minimum time for melting the bulking agent;

d) extrusion mixing the melted bulking agent from the orifice plug to a heating zone having a pressure control valve, wherein the pressure control valve is configured to include a minimum time for melting the bulking agent;

e) extrusion mixing the melted bulking agent from the heating zone having the pressure control valve to a heating zone having a vent port, wherein the vent port is configured to include a minimum evaporation time to reduce the moisture content of the confection to less than about 2%; and f) extrusion mixing the melted bulking agent from the heating zone having the vent port to the exit of the extruder to form a glassy confection.

2. The method according to claim 1 wherein the sugar or sugarless bulking agent is selected from the group consisting of monosaccharides, disaccharides, polysaccharides, sugar alcohols, polydextrose, maltodextrins, hydrogenated hexoses, hydrogenated disaccharides, and mixtures thereof.

3. The method according to claim 2 wherein the bulking agent is a sugar selected from the group consisting of xylose, rubulose, glucose (dextrose), mannose, galactose, fructose (levulose), sucrose, maltose, invert sugar, partially hydrolyzed starch, corn syrup solids, and mixtures thereof.

4. The method according to claim 2 wherein the bulking agent is a sugar alcohol selected from the group consisting of sorbitol, xylitol, mannitol, galactitol, maltitol, isomalt, hydrogenated starch hydrolysates and mixtures thereof.

5. The method according to claim 4 wherein the bulking agent is a mixture of isomalt and hydrogenated starch hydrolysate.

6. The method according to claim 4 wherein the bulking agent is isomalt.

7. The method according to claim 1 wherein the bulking agent is introduced into the barrel of the twin screw extruder via a screw feeder.

8. The method according to claim 1 wherein the first series of heating zones is configured to include, in the downstream direction of conveyance, forward feed screws, forward compression screws, reverse flight screws, and forward compression screws, respectively.

9. The method according to claim 1 wherein the orifice plug is configured to include two orifice discs to control the flow of material.

10. The method according to claim 1 wherein the pressure control valve is configured to include a controlling device to remove water vapor away from the extruder.

11. The method according to claim 1 wherein the heating zone having a pressure control valve further comprises forward feed screws.

12. The method according to claim 1 wherein the vent port is configured to include a vacuum device to remove water vapor away from the extruder.

13. The method according to claim 1 wherein the heating zone having a vent port further comprises forward mixing paddles.

14. The method according to claim 1 further comprising forward compression screws between the heating zone having the vent port and the exit of the extruder.

15. The method according to claim 1 wherein the twin screw extruder equipped with multiple heating zones comprises nine zones in the downstream direction of conveyance, wherein zone 1 comprises forward feed screws, zone 2 comprises forward feed screws, zone 3 comprises forward compression screws, zone 4 comprises reverse flight screws, zone 5 comprises forward compression screws and an orifice plug, zone 6 comprises forward feed screws and a pressure control valve, zone 7 comprises forward mixing paddles and a vent port, zone 8 comprises forward feed screws, and zone 9 comprises forward compression screws, respectively.

16. A confection comprising a sugar or sugarless bulking agent prepared by a method which comprises, in the downstream direction of conveyance, the continuous sequence of steps of:

a) introducing the bulking agent into the barrel of a twin screw extruder equipped with multiple heating zones;

b) extrusion mixing the bulking agent in a first series of heating zones of the extruder to melt the bulking agent, wherein the first series of heating zones is configured to include a minimum time for melting the bulking agent;

c) extrusion mixing and passing the melted bulking agent from the first series of heating zones to an orifice plug, wherein the orifice plug is configured to include a minimum time for melting the bulking agent;

d) extrusion mixing and passing the melted bulking agent from the orifice plug to a heating zone having a pressure control valve, wherein the pressure control valve is configured to include a minimum time for melting the bulking agent;

e) extrusion mixing and passing the melted bulking agent from the heating zone having a pressure control valve to a heating zone having a vent port, wherein the vent port is configured to include a minimum evaporation time to reduce the moisture content of the confection to less than about 2%; and f) extrusion mixing and passing the melted bulking agent from the heating zone having a vent port to the exit of the extruder barrel to form a melted bulking agent in the form of a glassy confection with minimal air bubbles.

17. The confection according to claim 16 wherein the sugar or sugarless bulking agent is selected from the group consisting of monosaccharides, disaccharides, polysaccharides, sugar alcohols, polydextrose, maltodextrins, hydrogenated hexoses, hydrogenated disaccharides and mixtures thereof.

18. The confection according to claim 17 wherein the bulking agent is a sugar selected from the group consisting of xylose, ribulose, glucose (dextrose), mannose, galactose, fructose (levulose), sucrose, maltose, invert sugar, partially hydrolyzed starch, corn syrup solids, and mixtures thereof.

19. The confection according to claim 17 wherein the bulking agent is a sugar alcohol selected from the group consisting of sorbitol, xylitol, mannitol, galactitol, maltitol, isomalt, hydrogenated starch hydrolysates and mixtures thereof.

20. The confection according to claim 19 wherein the bulking agent is a mixture of isomalt and a hydrogenated starch hydrolysate.

21. The confection according to claim 19 wherein the bulking agent is isomalt.

22. The method according to claim 16 wherein the twin screw extruder equipped with multiple heating zones comprises nine zones in the downstream direction of conveyance, wherein zone 1 comprises forward feed screws, zone 2 comprises forward feed screws, zone 3 comprises forward compression screws, zone 4 comprises reverse flight screws, zone 5 comprises forward compression screws and an orifice plug, zone 6 comprises forward feed screws and a pressure control valve, zone 7 comprises forward mixing paddles and a vent port, zone 8 comprises forward feed screws, and zone 9 comprises forward compression screws, respectively.

\* \* \* \* \*